IMAGE-VELOCITY RESPONSIVE SYSTEM

Original Filed Jan. 11, 1954 4 Sheets-Sheet 1

IMAGE-VELOCITY RESPONSIVE SYSTEM

Original Filed Jan. 11, 1954 4 Sheets-Sheet 2

IMAGE-VELOCITY RESPONSIVE SYSTEM

Original Filed Jan. 11, 1954 4 Sheets-Sheet 4

United States Patent Office

Re. 24,770

Reissued Jan. 19, 1960

24,770

IMAGE-VELOCITY RESPONSIVE SYSTEM

Irving W. Doyle, Massapequa, N.Y., and Donald G. C. Hare, Grass Valley, Calif., assignors to Fairchild Camera and Instrument Corporation, a corporation of Delaware Original No. 2,866,373, dated December 30, 1958, Serial No. 403,320, January 11, 1954. Application for reissue July 22, 1959, Serial No. 833,902

16 Claims. (Cl. 88—1)

Matter enclosed in heavy brackets [ ] appears in the original patent but forms no part of this reissue specification; matter printed in italics indicates the additions made by reissue.

This invention relates to image-velocity responsive systems and, while it is of general application, it is particularly suitable for use in measuring the ground speed of a photo-reconnaissance plane and will be specifically described in such an embodiment.

In aerial photo-reconnaissance, it is customary to employ a strip-film camera and at usual speeds and altitudes it is desirable to move the film during exposure so as to compensate for the relative image motion, that is, the apparent motion of the ground due to the motion of the plane and the camera. In order to impart such an image-motion compensation to the film it is, of course, necessary to know the ground speed of the plane, we well as its altitude. Heretofore several apparatuses have been proposed for measuring such ground speed but have left something to be desired in the way of accuracy and simplicity of apparatus.

It has been determined that an image-velocity responsive system should preferably work from the random or unpredictable distribution of detail in the ground image because, when any section of ground is traversed by a plane, the brightness of a spot as seen by the plane varies with time as such a random complex function. That function is the sum of a vast number of sinusoidal components of a wide range of frequencies of various amplitudes and phase relationships. The relative amplitudes of the components of different frequencies are affected by the size of the spot observed or the angle of view as determined by a scanning aperture on the plane. Low-frequency components predominate at wider viewing angles, corresponding to wider apertures, while the relative amplitudes of the high-frequency components increase for narrower viewing angles, corresponding to smaller scanning apertures.

One image-velocity system heretofore proposed relies for its operation upon the presence in the complex scanning wave of image brightness-versus-time of a component having a frequency exactly equal to that of a moving grid. Such a system is disclosed in Hancock et al. Patent No. 2,413,349. With such a system, the only useful signal component is that of a frequency equal to the grid frequency. All other components constitute noise in that they not only do not contribute any useful information but actually have a detrimental effect due to their tendency to mask the useful signal component. Further, in the use of such a system, if the complex scanning wave is such that the grid-frequency component is not present, the system has no output at all. In the practical case of a reasonable viewing angle, the grid-frequency component is the summation of a large number of individual components of this frequency, but of different amplitudes and phase angles. Therefore, even though the useful frequency of brightness variation does exist in a typical scanning wave, the several individual components partially cancel each other and if this occurs to a large extent, the amplitude of the resultant grid-frequency component is very substantially reduced to a value which may not give a satisfactory response.

The present invention constitutes an improvement on the image-velocity responsive system of the grid type and uses the principle of "correlation" in a system which is capable of utilizing a substantial portion of the total information contained in the complex random ground scanning wave. It is an object of the present invention, therefore, to provide a new and improved image-velocity responsive system which obviates one or more of the above-mentioned disadvantages of the prior art systems of this type.

It is another object of the invention to provide a new and improved image-velocity responsive system which utilizes a substantial portion of the total information available in the complex random ground scanning wave.

In accordance with the invention, an image-velocity responsive system comprises photoelectric apparatus for scanning a relatively moving object and developing therefrom leading and lagging electrical signals representative at any given instant of the illumination of different elemental areas of the object spaced in the direction of scanning, and adjustable time-delay apparatus for deriving from such leading signal a second electrical signal of related wave form but delayed in time with respect thereto. The system also comprises a circuit responsive jointly to such lagging signal and such delayed signal for developing a control signal varying in accordance with the time delay therebetween and control means responsive to such control signal for adjusting the time-delay apparatus to a point corresponding to a predetermined value of the control signal, whereby the amount of adjustment of the time-delay apparatus is representative of the relative object velocity.

For a better understanding of the present invention, together with other and further objects thereof, reference is had to the following description taken in connection with the accompanying drawings, while its scope will be pointed out in the appended claims.

Referring now to the drawings.

Figures 2, 3:
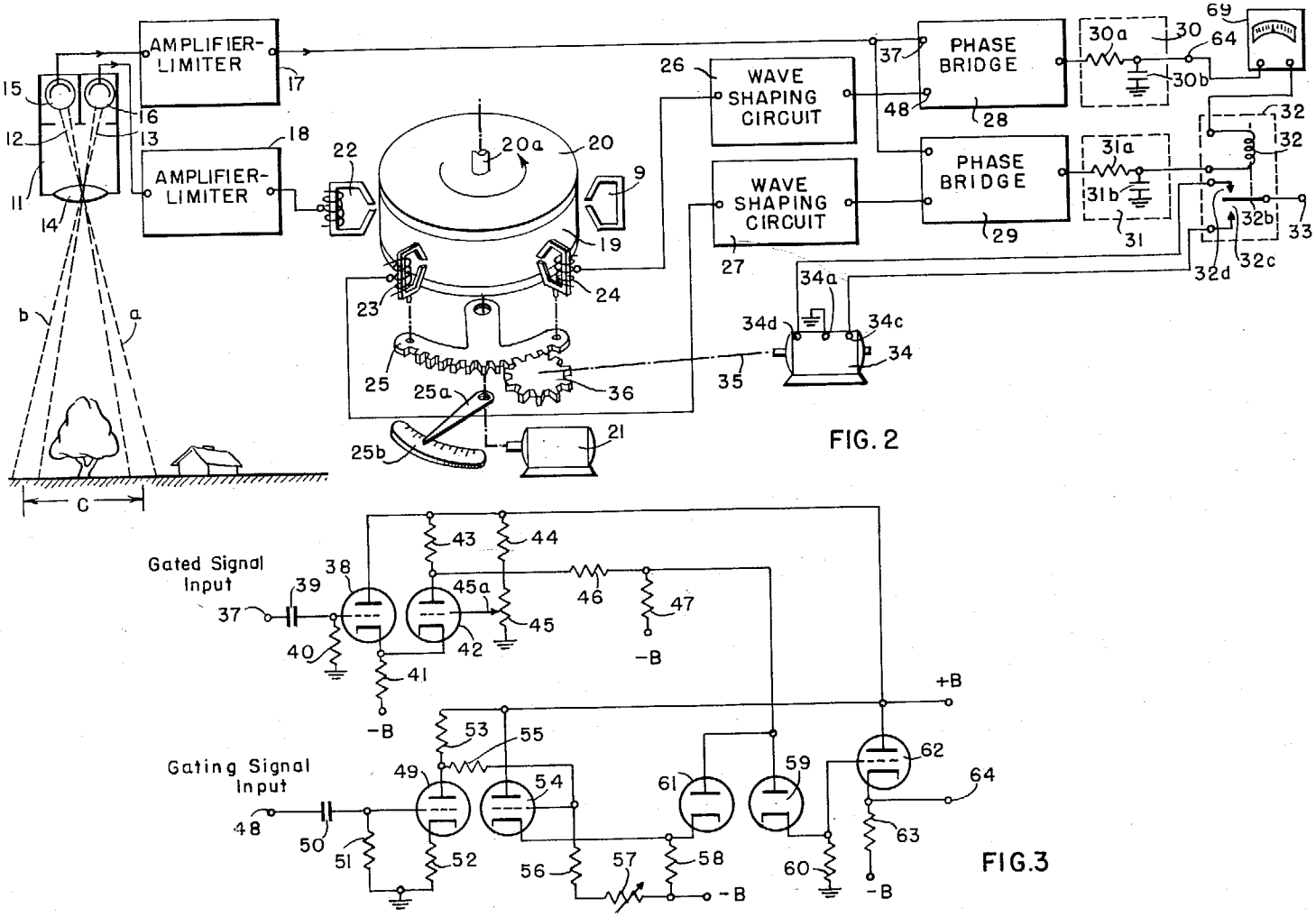
Fig. 2 is a representation, partially schematic, of a complete image-velocity responsive system embodying the invention and operating on the phase-coincidence correlation principle.
Fig. 3 is a schematic circuit diagram of such of the phase bridge units of the system of Fig. 2.
Figure 4:
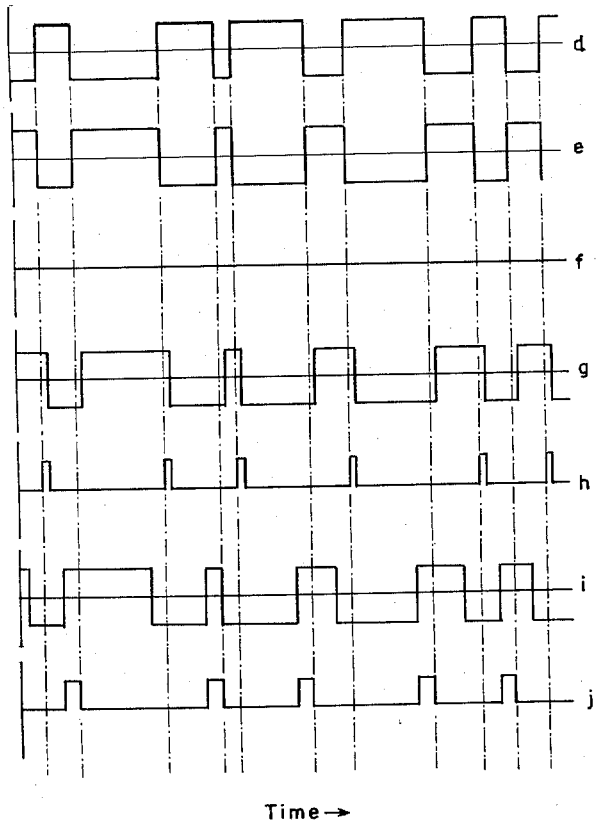
Figure 5:
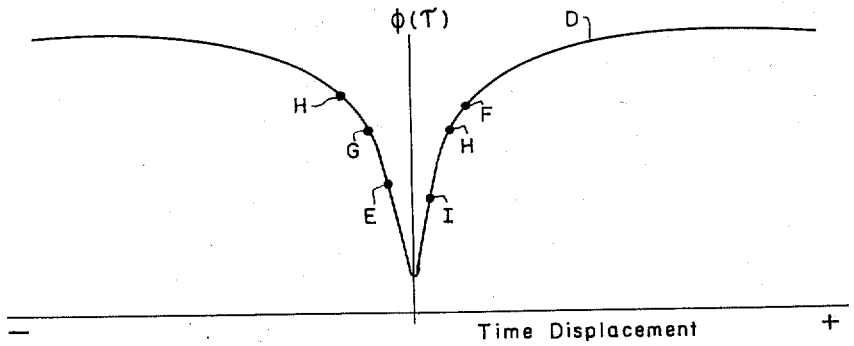
Figure 6:
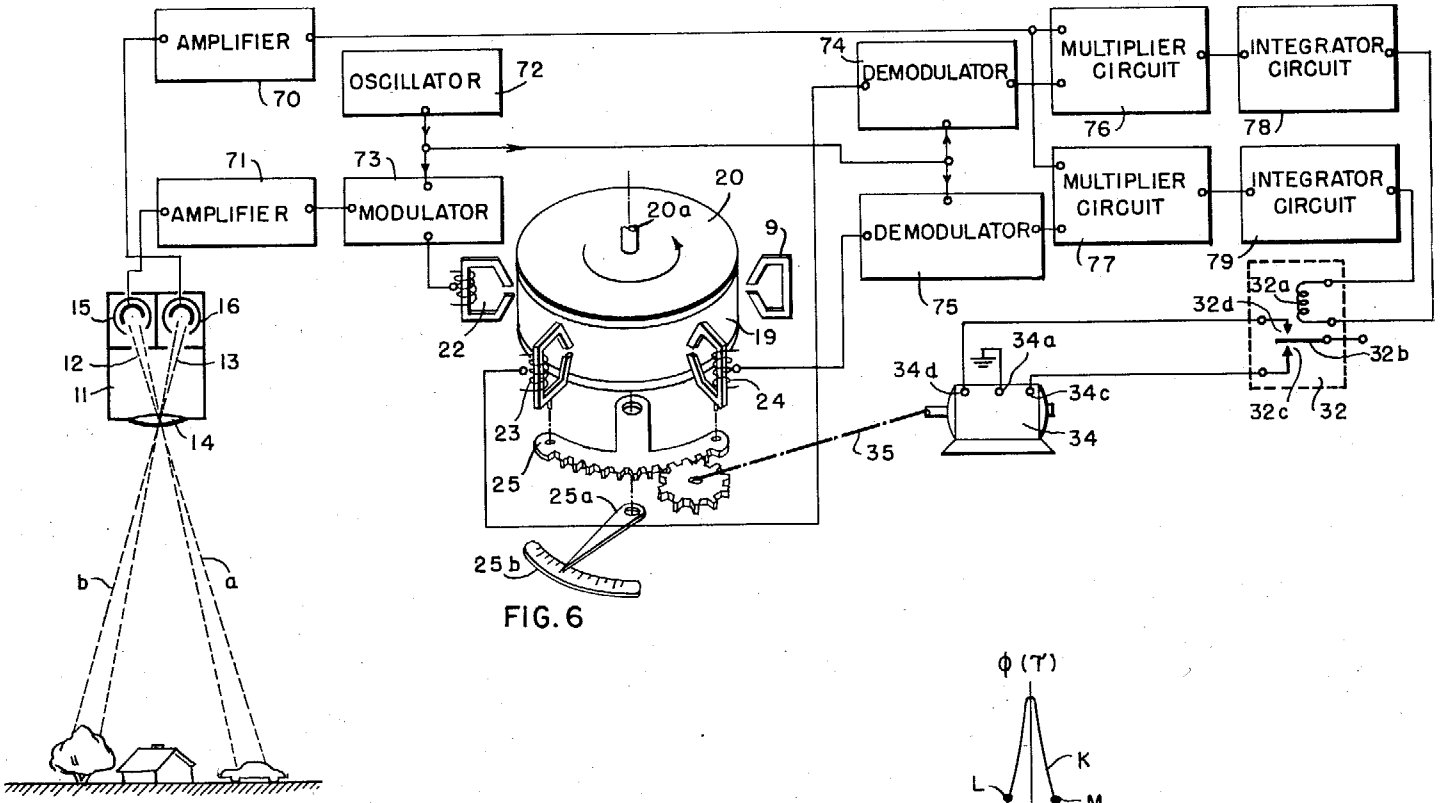
Figure 7:
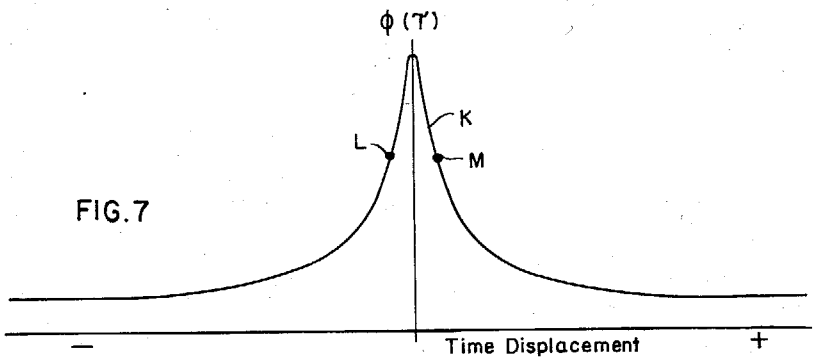

Fig. 4 comprises a series of curves used in explaining the operation of the system of Fig. 2;

Fig. 5 is a graph representing the response characteristic of the system of Fig. 2;

Fig. 6 is a modified form of image-velocity responsive system operating on what may be termed the "auto-correlation" principle rather than the phase-coincidence principle; while Fig. 7 is a graph representing the response characteristic of the system of Fig. 6.

Figure 1A:
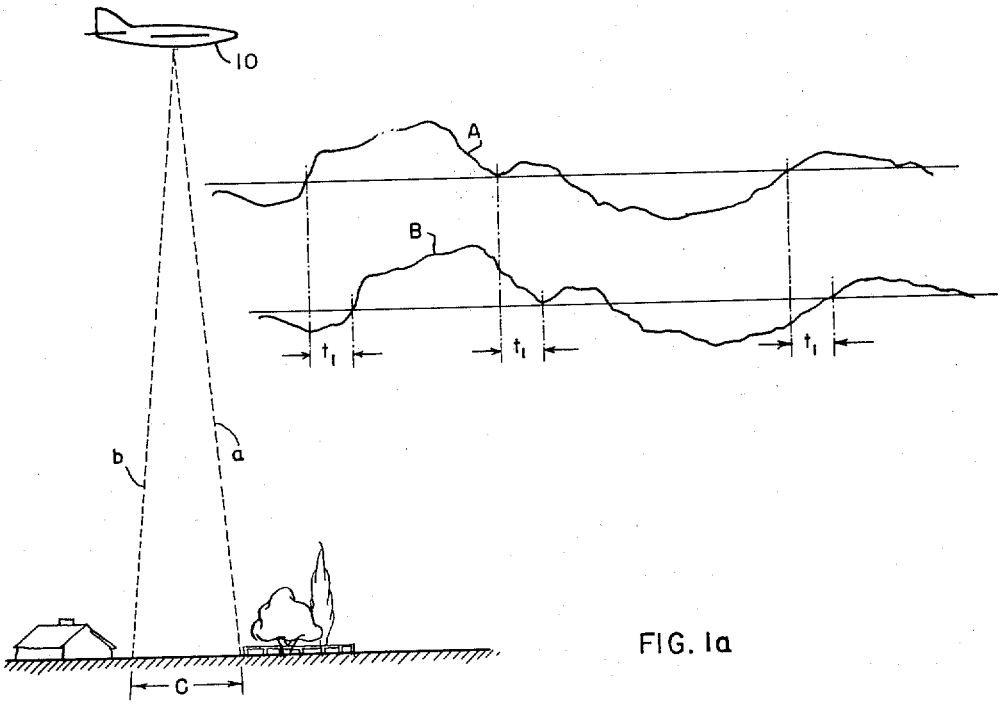
Fig. 1a is a graphical representation of typical random ground scanning waves developed by the image-velocity responsive system of the invention.
Figure 1B:
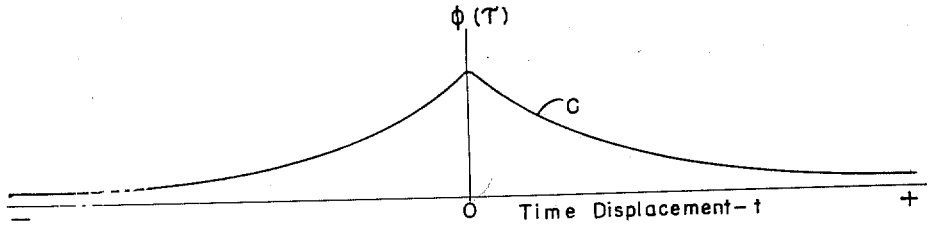
Fig. 1b is a graph representing a typical correlation function.

The fundamental principles of operation of the invention will be explained with reference to Figs. 1a, 1b, and 1c. The use of time-correlation techniques generally provide a means for detecting weaker signals in the presence of a greater noise field than by any other known techniques. Such time correlation may be either of the auto-correlation type or the simplified phase-coincidence type. In either case, the principle of correlation amounts to determining mathematically the extent to which common information exists in two functions, either or both of which may be complex. For example, referring to Fig. 1a, there is represented by curves A and B the ground scanning waves picked up by a plane 10 via two ground scanning paths a, b, respectively, having a space separation c at the ground. As the plane 10 passes over the terrain, curve A represents the variations of brightness-versus-time picked up by a scanning aperture and, it is seen, represents a random complex function of time. A short interval of time thereafter equal to the time required by the plane 10 to traverse the distance c, a ground scanning wave represented by curve B is picked up over the path b and constitutes a second complex ground scanning wave which ideally is identical, and in practice is substantially identical, to that of curve A but delayed in time with respect thereto by the interval $t_1$.

Assuming that the waves of curves A and B are identical, it has been demonstrated mathematically that, if such waves are multiplied together, the integral of the product within given time limits represents a quantity which varies as the auto-correlation function and is represented by the expression:

$$\phi(\tau)=\lim_{T\to\infty}\frac{1}{2T}\int_{-T}^{T}f_1(t)f_1(t+\tau)dt \qquad (1)$$

where:

T, —T=time limits of integration
$f_1(t)$=leading complex ground scanning wave
$f_1(t+\tau)$=lagging complex ground scanning wave If curves A and B are completely random, the auto-correleation function has only a single maximum at t=0. This auto-correlation function is represented by curve C of Fig. 1b, from which it is seen that the maximum is a relatively marked peak at the time t=0 and that the value of the function falls off rapidly at either side. As explained in more detail hereinafter, if the signals represented by curves A and B can be shifted electrically so that the time $t_1$ is reduced to zero so that the auto-correlation function is a maximum, the amount of relative shift in the signals will be representative of the ground speed of the plane 10 for any given altitude. Such auto-correlation function represents one special case employing the time-correlation principle.

As explained in more detail hereinafter, another special case employing the time-correlation principle is that of phase coincidence. If the signals represented by curves A and B are compared in a suitable phase detector, the output of the detector will be represented by curve D of Fig. 1c which, it is seen, has a very sharp dip at t=0 when the signals represented by curves A and B are in phase coincidence. By electrically shifting the two signals to produce phase coincidence, as determined by minimum detector output, curve D, again the amount of relative shift of the two signals will be representative of the ground speed of the plane 10 for any given altitude.

When utilizing either of the special correlation principles described, that is, auto-correlation or phase coincidence, the accuracy of response of the system is completely independent of the magnitude of the peaks of the response curves C, D and is dependent solely upon the amount of the relative shift of curves A and B to produce such maximum or minimum peaks. Furthermore, the sensitivity and accuracy of the system is relatively independent of the shape of the tie-correlation curves C, D, with the condition that there is a single readily identifiable maximum or minimum. Furthermore, it is not essential that the signals represented by curves A and B are exactly alike for the time-correlation principle provides means for responding only to like components of the two waves and disregarding unlike components. As a result of this characteristic, differences in sensitivity, linearity, etc., in the channels translating the signals represented by curves A and B, as well as other imperfections which give rise to differences between these two signals, have substantially no effect upon the overall accuracy of the system.

Referring now to Fig. 2 of the drawings, there is represented an imagevelocity responsive system embodying the invention comprising a photoelectric apparatus 11 for scanning a relatively moving object. For example, the apparatus 11 may be carried by a plane and directed to scan the ground traversed by the plane. The photoelectric apparatus includes a pair of apertures 12, 13 spaced in the direction of scanning, that is, in the direction of plane motion, and optical means for imaging the ground at the apertures, for example, an imaging lens 14. The apparatus 11 also includes a pair of photocells 15, 16 individually associated with the apertures 12, 13, respectively, for deriving from the object, that is, the ground, leading and lagging electrical signals representative at any given instant to the illumination of different elemental areas of the object spaced in the direction of scanning. For example, the photocell 15 and its associated aperture 12 may pick up via path "a" a narrow angle image of the ground and develop therefrom a leading electrical signal such as that represented by curve A of Fig. 1a, while the photocell 16 and its aperture 13 may pick up a narrow angle image of the ground spaced from the first image by the distance c and develop therefrom an electrical signal lagging with respect to the first signal, as represented by curve B of Fig. 1a.

The image-velocity responsive system of the invention also includes means for individually amplifying and limiting the signals generated by the photocells 15 and 16 to develop signals of substantially rectangular pulse wave form, this means comprising the amplifier-limiters 17, 18, respectively. For the sake of simplicity, the electrical circuit is represented by a single-line circuit diagram. The system further comprises adjustable time-delay apparatus for deriving from the amplified and limited leading signal second and third electrical signals of related wave form, specifically, of a derivative wave form, but adjustably delayed in time with respect to the leading signal, the third signal being fixedly delayed in time with respect to the second signal. Specifically, this time-delay apparatus includes a signal-storage element such as an endless magnetic tape 19 mounted on a drum 20 rotated at constant velocity by a constant speed motor 21. The time-delay apparatus further includes means for impressing the leading signal on the signal-storage element on tape 19, which may be in the form of a recording head 22 energized by the amplified and limited leading signal from the unit 18 for impressing such signal on the tape. The time-delay apparatus also includes a pair of signal pickup elements or heads 23, 24 associated with the tape 19 and fixed with respect to each other but jointly adjustably spaced from the fixed recording head 22, as by a mounting on a toothed sector 25 pivoted about the shaft 20a of the drum 20 and angularly adjusted by means described hereinafter. An erasing head 9 also registers with the tape 19 and is disposed at a suitable point following the pick-up head 24.

The image-velocity responsive system of the invention also includes wave-shaping circuits 26, 27 for converting the delayed signals developed by the pick-up heads 23, 24 to the same wave form as the limited leading signal output of the unit 18. There is also provided a phase detector circuit responsive jointly to the limited lagging signal and one of the delayed signals described for developing therefrom a control signal of a given polarity and varying similarly in accordance with variations of the time delay therebetween in either sense. This phase detector circuit may be in the form of a phase bridge 28 for developing from the amplified and limited lagging signal from the unit 17 and the delayed signal from the pick-up head 24 after shaping in the wave-shaping circuit 26, signal pulses occurring only during coincidence of the pulses of the two input signals thereof of a single given polarity.

The system also includes a second phase-detector circuit or phase bridge 29 coupled to the amplifier-limiter unit 17 and to the wave-shaping circuit 27 and responsive jointly to the lagging signal from the unit 17 and the delayed signal from the pick-up head 23 after shaping in unit 27 for developing a second control signal varying similarly to that developed by the phase bridge 28 in accordance with variations in the time delay between its two input signals in either sense. The phase bridge units 28 and 29 may be of any suitable well-known type, such as well-known gating circuits, for developing unidirectional output pusles which vary in width in accordance with variations in the phase displacement between their two input signals, such width variations being similar for phase displacements of either sense. Each of the phase bridge units 28, 29 may be of the form illustrated in more detail in Fig. 3 and described hereinafter. The output circuits of the phase bridge units 28, 29 are connected to averaging or integrating units 30, 31 comprising respectively series resistors 30a, 31a and shunt capacitors 30b, 31b.

The system further includes control means, such as a servomechanism including a polarized relay 32 responsive to the difference of the control signal outputs of the units 30, 31, for adjusting the time-delay apparatus including the sector 25 carrying the pick-up heads 23 and 24 so that these heads are disposed at points corresponding to predetermined values of such control signals, preferably to points corresponding to equal values of such signals. The polarized relay 32 includes a winding 32a differentially connected in the output circuits of units 30, 31 and a contact element 32b movable between two fixed contacts 32c and 32d. A meter 69 may be connected in series with the winding 32a to indicate the value of the differential current. The movable contact 32b is connected to one terminal 33 of a suitable source of power for a servomotor 34. The motor 34 may be of any conventional type of reversing motor having one terminal 34a connected to the other terminal of the source 33 and having reversing winding terminals 34c and 34d connected to the contacts 32c and 32d, respectively. The motor 34 is provided with a shaft indicated schematically at 35 connected to drive the toothed sector 25 through a pinion 36. Connected to sector 25 is a pointer or indicator 25a co-operating with a scale 25b to indicate the position or adjustment of sector 25.

Referring now to Fig. 3, there is represented schematically the circuit diagram of each of the phase bridge units 28, 29. The lagging signal from the amplifier-limiter unit 17 is applied to one input terminal 37 and this may be termed the "gated" signal. This signal is applied to a first vacuum-tube amplifier 38 through a coupling capacitor 39 and a grid resistor 40, the tube being provided with a cathode load resistor 41 returned to the negative terminal —B of the B-supply for the unit. The cathode load resistor 41 is cathode coupled to a second vacuum-tube amplifier 42 having an anode load resistor 43, the grid of the tube 42 being provided with an adjustable bias by means of a voltage divider comprising resistors 44, 45, the latter having an adjustable tap 45a. The anode potential of the tube 42 is supplied from a voltage divider comprising resistor 43 and resistors 46, 47 serially connected across the B supply, the resistor 43 being effectively in parallel with the resistors 46, 47 in the anode circuit of tube 42. Because of the cathode coupling from the tube 38 to the tube 42, the gated signal developed across the anode load resistor 47 is not reversed in polarity as it passes through the gated-signal channel.

The delayed and wave-shaped signal output of one of the pick-up heads 23, 24 is applied to an input terminal 48 and may be termed the gating signal. This signal is coupled to a vacuum-tube amplifier 49 through a coupling capacitor 50 and a grid resistor 51. The tube 49 is provided with a cathode-biasing resistor 52 and an anode load resistor 53, the latter of which is coupled to the control grid of a second vacuum tube 54 through a resistor 55 which, with a resistor 56 and an adjustable resistor 57, comprises a voltage divider connected across the B supply and controlling the bias of the grid of the tube 54. The tube 54 is also provided with a cathode load resistor 58. The signal outputs of the amplifier tubes 42 and 54 are compared in a "bridge" circuit connected across the load resistor 47, one branch of which includes a unilaterally conductive device such as a diode 59 and a series resistor 60. The other branch of the circuit includes a second unilaterally conductive device or diode 61 and the cathode load resistor 58 of amplifier 54. The signal developed across the resistor 60 is applied to an isolating amplifier 62 having a cathode load resistor 63 across which the output signal of the phase bridge appears and is applied to an output terminal 64.

Coming now to the operation of the image-velocity responsive system described above, it is noted that images of the ground being traversed by a plane are formed by the imaging lens 14 at the apertures 12 and 13 located at the image plane of the lens 14, these apertures 12 and 13 being spaced in the direction of motion of the plane. The light from any given point on the ground, represented by the beam a, first passes through the aperture 12 and impinges upon the photocell 15 which develops an output signal represented by curve A of Fig. 1a. A short time later, determined by the time required for the plane to travel the distance c, light from this same spot, represented by the beam b, passes through the other aperture 13 and impinges on the photocell 16, developing a signal represented by curve B of Fig. 1a. As stated above, the signals A and B are essentially of the same wave form, but the latter lags the former by the time required for the plane to traverse the distance c.

The alternating components of the signals from the photocells 15, 16 are passed through the amplifier-limiter units 17, 18, respectively, in which the signal is greatly amplified and severely limited so that it is reduced to a wave comprising a series of substantially rectangular pulses of random direction and random separation, for example, of the general form represented by curve d of Fig. 4. Such a signal from the amplifier-limiter unit 17 is passed directly to one input circuit of each of the phase bridge units 28, 29, for example, the terminal 37. This signal may be termed the gated signal. A similar signal from the amplifier-limiter 18 is impressed upon the recording head 22 associated with the magnetic tape 19 so that the signal is continuously impressed on the tape 19 as it revolves at constant velocity. This signal is picked up with predetermined time delays by the pick-up heads 23, 24, the delays being dependent upon the setting of the sector 25, but the delay between the signals from the heads 23, 24 being fixed by their relative spacing.

Since the pick-up heads 23, 24 respond only to a change in flux density of the magnetic tape 19 as it rotates, the signal outputs of these heads are effectively differentiated signals comprising positive and negative spikes occurring at the leading and trailing edges of the pulses of the input signal impressed on the tape by the head 22. Therefore, these differentiated signals are impressed upon the wave-shaping circuits 26, 27, respectively, which may be conventional bi-stable multi-vibrators which respond to the positive and negative spikes of the differentiated signals to regenerate rectangular pulse signals of a wave form identical to that impressed upon the recording head 22. The signal on the tape 19 is thereafter erased by the head 9 in a conventional manner for the reception of the continuing signal from the head 22. The regenerated or re-shaped pulse wave from the unit 26 is then impressed upon another input circuit of each of the phase bridge units 28, 29, for example, the terminal 48. This signal may be termed the gating signal.

Referring now to Fig. 3, the gated signal applied to the terminal 37 is amplified by the tubes 38, 42 which, because of the cathode coupling therebetween, develops across the load resistor 47 a pulse signal of the same polarity. Such a signal is represented by a curve e of Fig. 4. The delayed signal from one of the pick-up heads, for example, the head 24 is applied to the terminal 48 and amplified in the tubes 49, 54 which, by virtue of the conventional coupling therebetween, is effective to invert the polarity of the output signal developed across the cathode load resistor 58 of tube 54, as represented by curve d of Fig. 4.

The connection of the phase bridge circuit including the diodes 59, 61 is such that, whenever the gating signal developed across the resistor 58 is positive, the diode 61 is maintained non-conductive so that positive components of the gated signal developed across the load resistor 47 are transmitted through the diode 59 and applied to the amplifier 62 to develop a positive pulse across its load resistor 63. Even though the gating signal is positive as described, negative pulses of the gated signal developed across resistor 47 will not be transmitted to the output circuit because of the unidirectional characteristic of the diode 59. Whenever the gating signal developed across the resistor 58 is of negative polarity, the diode 61 is made conductive and the gated signal developed across resistor 47 passes through diode 61 and resistor 58. The resistance of this path is made small relative to that through the diode 59 and resistor 60 so that, under these conditions, the gated signal is effectively shunted from the resistor 60 and the output of the bridge circuit is substantially zero regardless of the polarity of the pulses of the gated signal. In brief, signal pulses are developed across the output resistor 63 only when both the gating signal and the gated signal pulses are positive concurrently.

Coming now to Fig. 4, curve d represents a gating signal derived from one of the pick-up heads, for example, the head 24, while curve e represents the gated signal derived directly from the amplifier-limiter unit 17. These two curves represent an adjustment of the system of Fig. 2 in which the time delay produced by the apparatus including the magnetic tape 19 is exactly equal to the delay between the leading and lagging image signals developed by the photocells 15, 16, respectively. Due to the fact that the gating-signal channel of the phase bridge circuit contains a phase inverter, while the gated-signal channel does not, the gated signal is exactly opposite in polarity to the gating signal. Further, since the delay has been properly adjusted, the gating signal and gated signal reverse polarity exactly in time coincidence, so that there is no time interval in which both the gated signal and the gating signal are positive and so that the output of the phase bridge circuit remains constant at zero, as represented by curve f.

Curve g represents a gated signal derived, for example, from pick-up head 23 when the time delay introduced by the delay apparatus including the tape 19 is shorter than that between the image signals developed by photocells 15, 16. In this case there is a short interval during each pulse when both the gating signal and the gated signal are positive simultaneously and there is developed across the output resistor 63 a pulse signal represented by curve h.

Concurrently the signal derived from the pick-up head 24 is delayed by an additional time interval equal to the time required for the tape 19 to move between the pick-up heads 23 and 24. This signal after re-shaping is represented by curve i of Fig. 4. Again, it is seen that there is an appreciable interval during each positive pulse of the gating signal d during which the gated signal i is also positive, so that there are developed across the load resistor 63 positive output pulses represented by curve j. In the case of the signals represented by each of curves h and j, the width of each output pulse, and, therefor the amount of energy in the output signal, varies with the time error which exists, that is, the difference between the time delay introduced by the magnetic tape 19 and that of the signals developed by the photocells 15, 16. Thus, it is seen that the inadequate time delay of the gated signal represented by curves g and h is considerably less than the over-delay represented by curves i and j. These output signals are averaged in the integrating circuits 30, 31 and it is noted that such averaged signals are of the same polarity irrespective of the sense of the delay error.

Figure 1C:
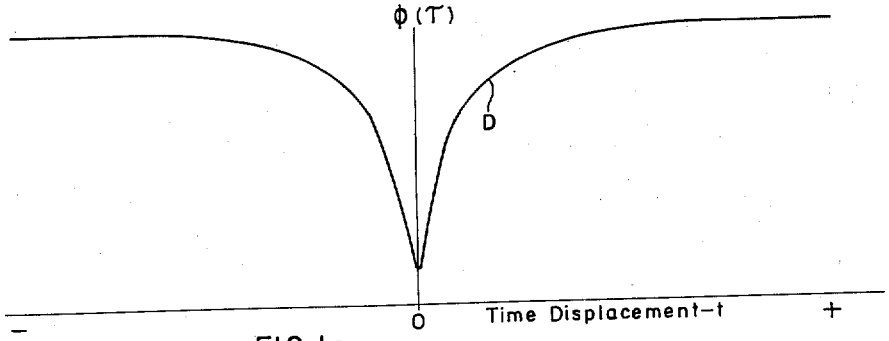
Fig. 1c is a graph of a specific form of correlation function which may be termed a phase-coincidence function.

Thus, the output characteristic of each of the phase bridges and its associated integrating circuit is represented by the curve of Fig. 5, which is a duplication of Fig. 1c. It is noted that this output has a minimum which is substantially zero when the time-delay error is zero. However, if the output of a single phase bridge were utilized to set the pick-up heads 23, 24, there would be an ambiguity in that the output would be the same for equal time errors of opposite senses. This would be satisfactory in case of manual adjustment of the sector 25, for then it would be adjusted to the point corresponding to minimum output as indicated on the meter 69.

However, in the case of an automatic system utilizing a servomechanism for re-adjusting the sector 25 it becomes necessary to resolve such ambiguity. This is done by the use of the two phase bridges embodied in the system of Fig. 2. For example, the conditions depicted in Fig. 4 may be represented by the points E and F of Fig. 5, the point E representing the average value of the signal of curve h and the point F representing the average value of the signal of curve j. The difference between the values E and F is applied to the winding 32a of the relay 32 and is effective to actuate its contact 32b to energize the servomotor 34, which adjusts the sector 25 to adjust the time delay in the gating-signal channel until the average values of the signals represented by curves h and j are equal. This condition may be represented by the points G and H of Fig. 5. Under these conditions, the polarized relay 32 is de-energized, the servomotor 34 stops, and the system is in equilibrium. Under these conditions, the position of the sector 25, which may be read from its associated pointer 25a and scale 25b, and thus the amount of adjustment of the pick-up heads 23, 24 is representative of the time delay of the signals developed by the photocells 15, 16 and, for any given altitude of the plane, is representative of the image velocity of the ground at the plane and the scale 25 may be calibrated directly in terms of time delay. In the event that under-delay of the gated signal derived from the head 23 represented by curve g is greater than the over-delay of the gated signal derived from the head 24, the average values of curves h and j may be represented by the points H and I of Fig. 5 and the servomechanism will adjust the sector 25 in the opposite direction to restore the system to equilibrium. Obviously, if a single phase bridge circuit were utilized and the sector 25 adjusted to the point of minimum signal output thereof, as represented on the meter 69, the pointer 25a and scale 25b would similarly represent the apparent image velocity.

Referring now to Fig. 6, there is represented schematically a modified form of the image-velocity responsive system embodying the invention and operating on the special principle of auto-correlation described above. In Fig. 6 elements corresponding to those of the system of Fig. 2 are identified by the same reference characters. The system of Fig. 6 includes a photoelectric scanning apparatus 11 identical to that of Fig. 2. In this case, however, the leading and lagging image signals developed by photocells 14 and 16, respectively, are impressed upon amplifier units 70 and 71, respectively, which are preferably linear amplifiers and do not appreciably limit the signals translated thereby. The system also includes a generator of oscillations such as an oscillator 72 and means for utilizing the leading signal from the photocell 15 to modulate the oscillations from oscillator 72, this means being in the form of a conventional modulator 73. The output of modulator 73 is connected to the recording head 22 for impressing such modulated oscillation signal on the tape 19. The pick-up heads 23, 24 and their adjusting mechanism, as well as the erasing head 9, are identical to corresponding elements of the system of Fig. 2. However, in this form of the invention, the pickup heads 23, 24 derive from the tape 19 modulated oscillation signals, the modulation envelopes of which, at equilibrium, are delayed with respect to that of the signal impressed on the recording head 22 by an amount equal to the delay between the signals developed by the photocells 15 and 16.

The image-velocity responsive system of Fig. 6 also includes means for deriving from the modulated oscillation signals picked up by the heads 23, 24 signals similar in wave form to the leading signal developed by the photocell 15 but delayed in time with respect thereto. These means may be in the form of conventional demodulators 74, 75 coupled to the pick-up heads 23, 24, respectively. The oscillator 72 is also coupled to the demodulators 74, 75 for supplying thereto oscillation signals of the same frequency and phase as supplied to the modulator 73 to effect homodyne demodulation or detection.

The image-velocity responsive system of Fig. 6 also includes means for developing control signals varying in accordance in the time delay between the lagging signal and the delayed signals developed as described. These means may comprise a pair of multiplier circuits 76, 77, individually responsive jointly to the lagging signal from the photocell 16 and the delayed demodulated signal from the units 74, 75, respectively, for developing control signals representative of the product of the input signals of the units. The multipliers 76, 77 may be of any conventional type, for example, of the type comprising an electron-coupled modulator in which the two signal inputs are supplied to successive control grids in the electron stream. One example of such a modulator is described in United States Patent No. 1,958,027 to Wheeler. The unidirectional output signals of the multipliers 76, 77 are coupled to integrator circuits 78, 79 which may be of any suitable type such as the integrators 30, 31 of the system of Fig. 2. The output circuits of the units 78, 79 are differentially connected to the winding 32a of polarized relay 32, the relay 32, servomotor 34, and actuating mechanism of the sector 25 being the same as that of the system of Fig. 2.

The operation of the system of Fig. 6 is basically similar to that of Fig. 2, except that in the former the leading and lagging signals are multiplied without limiting to develop the auto-correlation function. Specifically, the leading signal is modulated by oscillations from the unit 72 in the modulator 73 and by means of the recording head 22 impressed on magnetic tape 19. Delayed modulated signals are picked up by the heads 23, 24 and impressed upon demodulators 74, 75, respectively, wherein the modulation signals are derived by homodyne detection. The signal outputs of the demodulators 74, 75 are, therefore, exact replicas of the signal outputs of the photocell 15, but both delayed in time with respect thereto by amounts depending upon the setting of the sector 25, while the fixed delay between the two demodulated signals is determined by the spacing of the pick-up heads 23, 24. These two delayed demodulated signals are then applied to the multiplier circuits 76, 77 wherein their instantaneous values are continuously multiplied by the concurrent instantaneous values of the amplified lagging signal derived from the photocell 16.

As pointed out above in Equation 1, it can be shown mathematically that each of these product signals is representative of the auto-correlation function and that when averaged in the integrator circuits 78, 79 each has a value varying with time displacement represented by curve K of Fig. 7. As in the system of Fig. 2, the servo-mechanism comprising the relay 32 and the servomotor 34 respond to these integrated signals to adjust the sector 25 to a position in which the two product signals are of equal value, for example, as represented by the points L and M of Fig. 7, at which point the system is in equilibrium and the relay 32 and motor 34 are de-energized. Also, as in the system of Fig. 2, if it is desired to actuate the time-delay apparatus including the sector 25 manually, only a single pick-up head, demodulator, and multiplier channel need be provided, in which case the delay apparatus is adjusted to the maximum signal point of the characteristic of Fig. 7 as determined by the reading of meter 69.

While there have been described what are at present considered to be the preferred embodiments of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A velocity responsive system comprising: photosensitive apparatus for scanning a relatively moving object and developing therefrom leading and lagging signals representative at any given instant of the illumination of different elemental areas of the object spaced in the direction of scanning; adjustable time-delay apparatus for deriving from said leading signal a second signal of related wave form but delayed in time with respect thereto; a circuit responsive jointly to said lagging signal and said delayed signal for developing a control signal varying in accordance with the time delay therebetween; and control means responsive to said control signal for adjusting said time-delay apparatus to a point corresponding to a predetermined value of said control signal, whereby the amount of adjustment of said time-delay apparatus is representative of the relative object velocity.

2. An image-velocity responsive system comprising: photoelectric apparatus for scanning a relatively moving object including a pair of apertures spaced in the direction of scanning, optical means for imaging said object at said apertures, and a pair of photocells individually associated with said apertures for developing leading and lagging electrical signals representative at any given instant of the [illumination of] *radiant energy radiated by* different elemental areas of the object spaced in the direction of scanning; *means including* adjustable time-delay apparatus for deriving from said leading signal a second electrical signal of related wave form but delayed in time with respect thereto; [a circuit] *means* responsive jointly to said lagging signal and said delayed signal for developing a control [signal] *effect* varying in accordance with the time delay therebetween; and control means responsive to said control [signal] *effect* for adjusting said time-delay apparatus to a point corresponding to a predetermined value of said control [signal] *effect*, whereby the amount of adjustment of said time-delay apparatus is representative of the relative object velocity.

3. An image-velocity responsive system comprising: photoelectric apparatus for scanning a relatively moving object and developing therefrom leading and lagging electrical signals representative at any given instant of the [illumination of] *radiant energy radiated by* different elemental areas of the object spaced in the direction of scanning; adjustable time-delay apparatus including a movable signal-storage element, means for impressing said leading signal on said element, and *means including* a pick-up element adjustably spaced from said impressing means for deriving from said leading signal a second electrical signal of related wave form but delayed in time with respect thereto; [a circuit] *means* responsive jointly to said lagging signal and said delayed signal for developing a control [signal] *effect* varying in accordance with the time delay therebetween; and control means responsive to said control [signal] *effect* for adjusting said time-delay apparatus to a point corresponding to a predetermined value of said control [signal] *effect,* whereby the amount of adjustment of said time-delay apparatus is representative of the relative object velocity.

4. An image-velocity responsive system comprising: photoelectric apparatus for scanning a relatively moving object and developing therefrom leading and lagging electrical signals representative at any given instant of the [illumination of] *radiant energy radiated by* different elemental areas of the object spaced in the direction of scanning; adjustable time-delay apparatus including a constant-velocity moving magnetic tape, a recording head for impressing said leading signal on said tape, and *means including* a pick-up head adjustably spaced from said recording head in the direction of tape movement for deriving from said leading signal a second electrical signal of related wave form but delayed in time with respect thereto; [a circuit] *means* responsive jointly to said lagging signal and said delayed signal for developing a control [signal] *effect* varying in accordance with the time delay therebetween; and control means responsive to said control [signal] *effect* for adjusting said pick-up head to a point corresponding to a predetermined value of said control [signal] *effect,* whereby the amount of adjustment of said pick-up head is representative of the relative object velocity.

5. An image-velocity responsive system comprising: photoelectric apparatus for scanning a relatively moving object and developing therefrom leading and lagging electrical signals representative at any given instant of the [illumination of] *radiant energy radiated by* different elemental areas of the object spaced in the direction of scanning; means for individually amplifying and limiting said signals to develop signals of substantially rectangular pulse wave form; *means including* adjustable time-delay apparatus for deriving from said limited leading signal a second electrical signal of the same wave form but delayed in time with respect thereto; [a circuit] *means* responsive jointly to said limited lagging signal and said delayed signal for developing a control [signal] *effect* varying in accordance with the time delay therebetween; and control means responsive to said control [signal] *effect* for adjusting said time-delay apparatus to a point corresponding to a predetermined value of said control [signal] *effect,* whereby the amount of adjustment of said time-delay apparatus is representative of the relative object velocity.

6. An image-velocity responsive system comprising: photoelectric apparatus for scanning a relatively moving object and developing therefrom leading and lagging electrical signals representative at any given instant of the [illumination of] *radiant energy radiated by* different elemental areas of the object spaced in the direction of scanning; *means for individually amplifying and limiting said signals to develop signals of substantially rectangular wave form;* adjustable time-delay apparatus including a constant-velocity moving magnetic tape, a recording head for impressing said limited leading signal on said tape, and *means including* a pick-up head adjustably spaced from said recording head in the direction of tape movement for deriving from said limited leading signal a second electrical signal of derivative wave form but delayed in time with respect thereto; a wave-shaping circuit for converting said derivative signal to the same wave form as said limited leading signal; [a circuit] *means* responsive jointly to said limited lagging signal and said delayed signal for developing a control [signal] *effect* varying in accordance with the time delay therebetween; and control means responsive to said control [signal] *effect* for adjusting said time-delay apparatus to a point corresponding to a predetermined value of said control [signal] *effect,* whereby the amount of adjustment of said time-delay apparatus is representative of the relative object velocity.

7. An image-velocity responsive system comprising: photoelectric apparatus for scanning a relatively moving object and developing therefrom leading and lagging electrical signals representative at any given instant of the [illumination of] *radiant energy radiated by* different elemental areas of the object spaced in the direction of scanning; *means including* adjustable time-delay apparatus for deriving from said leading signal a second electrical signal of related wave form but delayed in time with respect thereto; a phase detector [circuit] *means* responsive jointly to said lagging signal and said delayed signal for developing a control [signal] *effect* varying in accordance with the time delay therebetween; and control means responsive to said control [signal] *effect* for adjusting said time-delay apparatus to a point corresponding to a predetermined value of said control [signal] *effect,* whereby the amount of adjustment of said time-delay apparatus is representative of the relative object velocity.

8. An image-velocity responsive system comprising: photoelectric apparatus for scanning a relatively moving object and developing therefrom leading and lagging electrical signals representative at any given instant of the [illumination of] *radiant energy radiated by* different elemental areas of the object spaced in the direction of scanning; means for individually amplifying and limiting said signals to develop signals of substantially rectangular pulse wave form; *means including* adjustable time-delay apparatus for deriving from said limited leading signal a second electrical signal of the same wave form but delayed in time with respect thereto; a circuit responsive jointly to said limited lagging signal and said delayed signal for developing therefrom output signal pulses occurring only during coincidence of pulses thereof of a single given polarity; [circuit means] *means* for integrating said ouput pulses to develop a control [signal] *effect* varying in accordance with the time delay therebetween; and control means responsive to said control [signal] *effect* for adjusting said time-delay apparatus to a point corresponding to a predetermined value of said control [signal] *effect,* whereby the amount of adjustment of said time-delay apparatus is representative of the relative object velocity.

9. An image-velocity responsive system comprising: photoelectric apparatus for scanning a relatively moving object and developing therefrom leading and lagging electrical signals representative at any given instant of the [illumination of] *radiant energy radiated by* different elemental areas of the object spaced in the direction of scanning; adjustable time-delay apparatus including a constant-velocity moving magnetic tape, a recording head for impressing said leading signal on said tape, and *means including* a pick-up head adjustably spaced from said recording head in the direction of tape movement for deriving from said leading signal a second electrical signal of related wave form but delayed in time with respect thereto; [a circuit] *means* responsive jointly to said lagging signal and said delayed signal for developing a control [signal] *effect* varying in accordance with the time delay therebetween; and a servomechanism responsive to said control [signal] *effect* for adjusting said pick-up head to a point corresponding to a predetermined value of said control [signal] *effect,* whereby the amount of adjustment of said pick-up is representative of the relative object velocity.

10. An image-velocity responsive system comprising: photoelectric apparatus for scanning a relatively moving object and developing therefrom leading and lagging electrical signals representative at any given instant of the [illumination of] *radiant energy radiated by* different elemental areas of the object spaced in the direction of scanning; *means including* adjustable time-delay apparatus for deriving from said leading signal second and third electrical signals of related wave form but adjustably delayed in time with respect to said leading signal, said third signal being fixedly delayed in time with respect to said second signal; [a circuit] *means* responsive jointly to said lagging signal and said second signal for developing a first control [signal] *effect* varying similarly in accordance with variations of the time delay therebetween in either sense; a circuit responsive jointly to said lagging signal and said third signal for developing a second control [signal] *effect* varying similarly in accordance with variations of the time delay therebetween in either sense; and control means responsive jointly to said control [signals] *effects* for adjusting said time-delay apparatus to a point corresponding to equality of said control [signals] *effects,* whereby the amount of adjustment of said time-delay apparatus is representative of the relative object velocity.

11. An image-velocity responsive system comprising: photoelectric apparatus for scanning a relatively moving object and developing therefrom leading and lagging electrical signals representative at any given instant of the [illumination of] *radiant energy radiated by* different elemental areas of the object spaced in the direction of scanning; *means including* adjustable time-delay apparatus for deriving from said leading signal second and third electrical signals of related wave form but adjustably delayed in time with respect to said leading signal, said third signal being fixedly delayed in time with respect to said second signal; [a circuit] *means* responsive jointly to said lagging signal and said second signal for developing a first control signal of a given polarity and varying similarly in accordance with variations of the time delay therebetween in either sense; a circuit responsive jointly to said lagging signal and said third signal for developing a second control signal of the same polarity as said first control signal and varying similarly in accordance with variations of the time delay therebetween in either sense; and control means including a polarized relay responsive to the difference of said control signals for adjusting said time-delay apparatus to a point corresponding to equality of said control signals, whereby the amount of adjustment of said time-delay apparatus is representative of the relative object velocity.

12. An image-velocity responsive system comprising: photoelectric apparatus for scanning a relatively moving object and developing therefrom leading and lagging electrical signals representative at any given instant of the [illumination of] *radiant energy radiated by* different elemental areas of the object spaced in the direction of scanning; *means including* adjustable time-delay apparatus for deriving from said leading signal a second electrical signal of related wave form but delayed in time with respect thereto; a modulator circuit responsive jointly to said lagging signal and said delayed signal for developing a control signal representative of the product thereof; and control means responsive to said control signal for adjusting said time-delay apparatus to a point corresponding to a predetermined value of said control signal, whereby the amount of adjustment of said time-delay apparatus is representative of the relative object velocity.

13. An image-velocity responsive system comprising: photoelectric apparatus for scanning a relatively moving object and developing therefrom leading and lagging electrical signals representative at any given instant of the [illumination of] *radiant energy radiated by* different elemental areas of the object spaced in the direction of scanning; a generator of oscillations; means for utilizing said leading signal to modulate said oscillations; adjustable time-delay apparatus including a constant-velocity moving magnetic tape, a recording head for impressing said modulated-oscillation signal on said tape, and a pick-up head adjustably spaced from said recording head in the direction of tape movement for deriving a second modulated-oscillation signal; a demodulator for deriving from said second signal a signal similar in wave form to said leading signal but delayed in time with respect thereto; [a circuit] *means* responsive jointly to said lagging signal and said delayed signal for developing a control signal varying in accordance with the time delay therebetween; and control means responsive to said control signal for adjusting said time-delay apparatus to a point corresponding to a predetermined value of said control signal, whereby the amount of adjustment of said time-delay apparatus is representative of the relative object velocity.

14. A velocity responsive system comprising: photosensitive apparatus for scanning a relatively moving object and developing therefrom leading and lagging signals representative at any given instant of the illumination of different elemental areas of the object spaced in the direction of scanning; adjustable time-delay apparatus for deriving from said leading signal a second signal of related wave form but delayed in time with respect thereto; a circuit responsive jointly to said lagging signal and said delayed signal for developing a control signal varying in accordance with the time delay therebetween; and control means responsive to said control signal for adjusting said time-delay apparatus to a point corresponding to a predetermined value of said control signal, whereby the amount of adjustment of said time-delay aparatus is representative of the relative object velocity.

*15. An image-velocity responsive system comprising: photoelectric apparatus for scanning a relatively moving object and developing therefrom leading and lagging electrical signals representative at any given instant of the radiant energy radiated by different elemental areas of the object spaced in the direction of scanning; means including adjustable time-delay apparatus for deriving from said leading signal a second electrical signal of related wave form but delayed in time with respect thereto; means responsive jointly to said lagging signal and said delayed signal for developing a control effect varying in accordance with the time delay therebetween; and control means responsive to said control effect for adjusting said time-delay apparatus to a point corresponding to a predetermined value of said control effect, whereby the amount of adjustment of said time-delay apparatus is representative of the relative object velocity.*

*16. A velocity responsive system comprising: photosensitive apparatus for scanning a relatively moving object and developing therefrom leading and lagging signals representative at any given instant of the radiant energy radiated by different elemental areas of the object spaced in the direction of scanning; means including adjustable time-delay apparatus for deriving from said leading signal a second signal of related wave form but delayed in time with respect thereto; means responsive jointly to said lagging signal and said delayed signal for developing a control effect varying in accordance with the time delay therebetween; and control means responsive to said control effect for adjusting said time-delay apparatus to a point corresponding to a predetermined value of said control effect, whereby the amount of adjustment of said time-delay apparatus is representative of the relative object velocity.*

References Cited in the file of this patent or the original patent

UNITED STATES PATENTS

| | | |
|---|---|---|
| 2,142,378 | Sachtleben | Jan. 3, 1939 |
| 2,166,991 | Guanella | July 25, 1939 |
| 2,253,975 | Guanella | Aug. 26, 1941 |
| 2,410,424 | Brown | Nov. 5, 1946 |
| 2,422,135 | Sanders | June 10, 1947 |
| 2,439,295 | Hammond et al. | Apr. 6, 1948 |